W. ROSE.
APPARATUS FOR SCORING, PUNCHING, AND CUTTING PAPER, CARDBOARD, AND THE LIKE.
APPLICATION FILED JAN. 8, 1921.

1,373,355.

Patented Mar. 29, 1921.

Inventor
William Rose
By Howson and Howson
Attorneys

W. ROSE.
APPARATUS FOR SCORING, PUNCHING, AND CUTTING PAPER, CARDBOARD, AND THE LIKE.
APPLICATION FILED JAN. 8, 1921.

1,373,355.

Patented Mar. 29, 1921.

Inventor
William Rose
By Howson and Howson,
Attorneys

W. ROSE.
APPARATUS FOR SCORING, PUNCHING, AND CUTTING PAPER, CARDBOARD, AND THE LIKE.
APPLICATION FILED JAN. 8, 1921.
1,373,355. Patented Mar. 29, 1921.
7 SHEETS—SHEET 5.
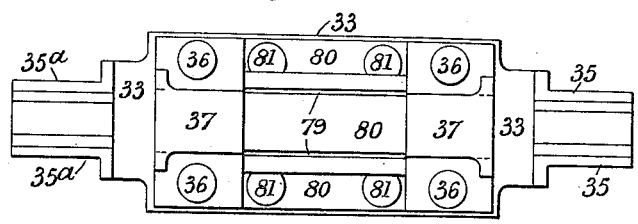
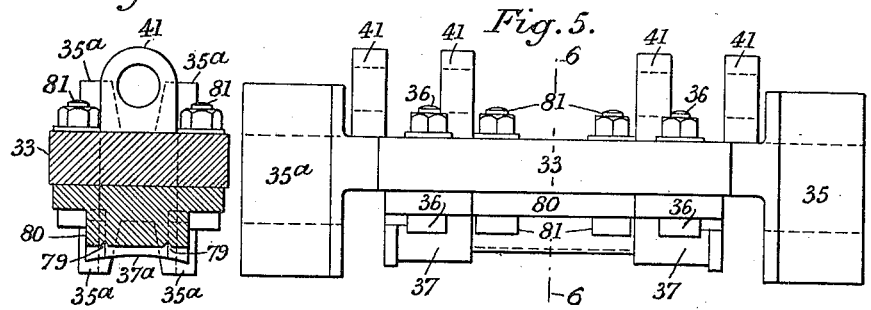
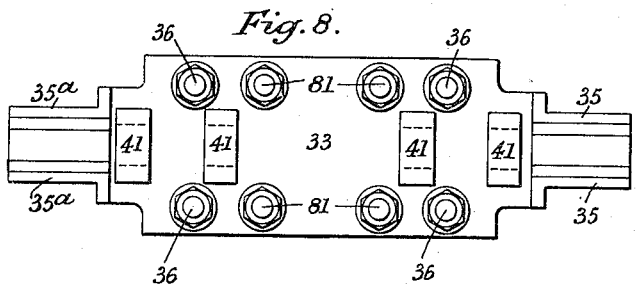
Inventor
William Rose
By Howson and Howson,
Attorneys W. ROSE.
APPARATUS FOR SCORING, PUNCHING, AND CUTTING PAPER, CARDBOARD, AND THE LIKE.
APPLICATION FILED JAN. 8, 1921.
1,373,355.
Patented Mar. 29, 1921.
7 SHEETS—SHEET 6.
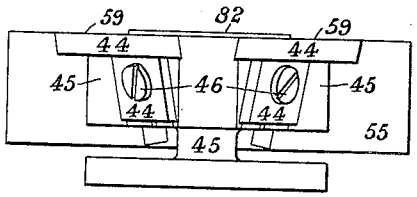
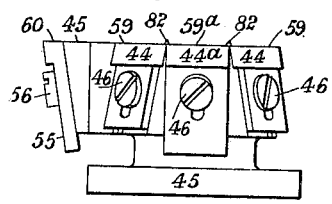
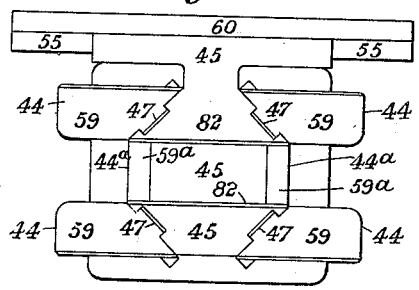
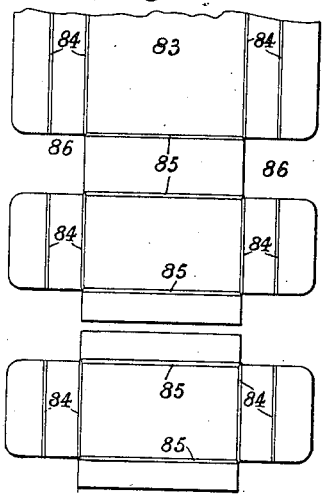
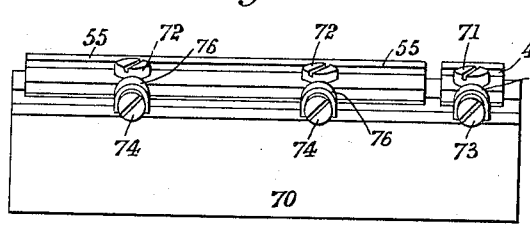
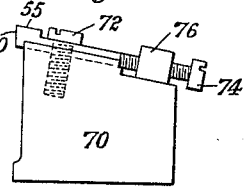
Inventor
William Rose
By Howson and Howson
Attorneys

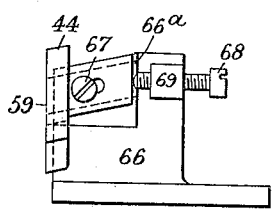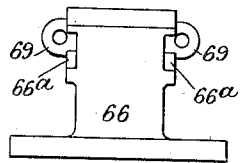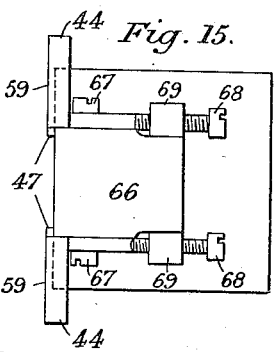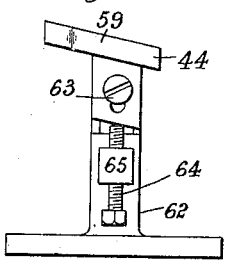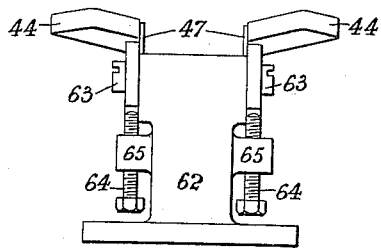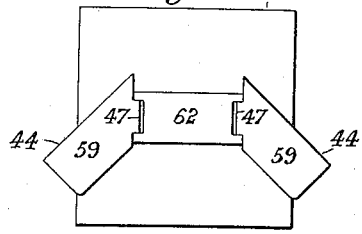

UNITED STATES PATENT OFFICE.

WILLIAM ROSE, OF GAINSBOROUGH, ENGLAND.

APPARATUS FOR SCORING, PUNCHING, AND CUTTING PAPER, CARDBOARD, AND THE LIKE.

1,373,355.　　　　　Specification of Letters Patent.　　Patented Mar. 29, 1921.

Application filed January 8, 1921. Serial No. 435,913.

*To all whom it may concern:*

Be it known that I, WILLIAM ROSE, a subject of the King of Great Britain, residing at Albion Works, Gainsborough, in the county of Lincoln, England, have invented new and useful Improvements in Apparatus for Scoring, Punching, and Cutting Paper, Cardboard, and the like, of which the following is a specification.

The object of this invention is to provide very simple, and efficient, means for scoring, punching, and cutting, paper, cardboard, and the like, so as to produce, for instance, wrappers, or blanks, for packeting, printing, box-making, or other purposes. In apparatus as hitherto constructed for such purposes, certain objectionable features have existed, for instance, it has been found necessary to employ the most expert skill not only in originally shaping, but in subsequently renovating and adjusting with the requisite accuracy, the operative portions of the punches, dies, and cutting devices, employed for giving the required shape to the wrappers, or blanks, any want of such expert skill and care having entailed very great risk of the punches and dies being rendered totally inefficient in operation, and of the cutting devices failing to properly cut the wrappers, or blanks, to the required uniform size, and there has also been liability to collision and breakage of the co-acting parts while the apparatus is in operation.

This invention has for its principal object to overcome these objections and to provide apparatus which will insure the production of wrappers, or blanks, of accurate, and uniform, shape and size, and enable even unskilled persons to renovate such portions of the punches, dies, and cutting devices, as may become worn, and afterward with great readiness, refix them, without expert skill, accurately in place for effective work.

In such apparatus constructed in accordance with this invention, I provide a pair of rollers rotatable in adjustable bearings and means for imparting movements of partial rotation thereto, together with any suitable means for supplying to between the said rollers the web of material to be operated upon. I also provide means for punching the said material, the said means comprising removable and replaceable angular die-pieces, the acting faces and edges of which have angled continuations of the same cross-sectional form, and the said die-pieces being fixable in correspondingly angled guides in a supporting block, or bolster, so that, when the said acting faces, and edges, become worn by use, the die-pieces can be removed and ground on similarly inclined jigs to produce fresh operative faces and edges and then the said die-pieces be readily brought into, and fixed in accurate position on the supporting block, or bolster, for reuse. I further provide means for cutting off exact lengths of punched material to constitute wrappers, or blanks, of the requisite shape, and these may be scored, or creased, where they are to be bent, or folded, in which case one of the aforesaid rollers will be provided with ridges, or disks, and, if desired, the opposed roller, or surface, may be provided with corresponding grooves. The punching pieces may be formed with curved, (preferably concaved) acting faces to facilitate their action. The cutting device preferably comprises a stationary blade, or shearing plate, angled and adjustable and fixable on an angled supporting face to facilitate renovating, adjustment, and refixing analogously to the way in which the die-pieces are capable of being removed, renovated, and refixed. The movable blade is preferably swingingly supported upon an arm which can be directly, or indirectly, operated from the main shaft and can be kept up against the stationary blade by a spring.

I will now describe, with reference to the accompanying drawings, a construction of machine in accordance with this invention, premising that I do not limit myself to the precise details shown in these drawings and described with reference thereto.

Fig. 5 is a front elevation, Fig. 6 a transverse section (on the line 6—6, Fig. 5); Fig. 7 a plan of underside and Fig. 8 a plan of upperside showing the hereinafter described reciprocable bar, or frame, with the punching device thereon.

Fig. 9 is a rear elevation, Fig. 10 a plan, and Fig. 11 an end elevation, of the supporting block, or bolster, with the die-pieces, and shearing plate in place thereon.

Fig. 12 shows an end elevation and Fig. 13 a rear elevation of the holder, or jig, on which the stationary blade, or shearing plate, and certain of the die-pieces, are secured, while the operative edge of the said stationary blade, or shearing plate, and the faces of the said die-pieces, are being ground, or renovated.

Fig. 14 is an end view, and Fig. 15 a plan, of the holder, or jig, on which the other die-pieces are secured, while the faces thereof are being renovated by grinding.

Fig. 16 is a front elevation of Fig. 14, but without the die-pieces in place thereon.

Fig. 17 is a front elevation, Fig. 18 a plan and Fig. 19 a side elevation, of the holder, or jig, on which the die-pieces can be secured, while their edges are originally ground to the correct angle and shape.

Fig. 20 shows a part of the web of material from which portions have been removed by the punches and dies. It also shows the scored and creased lines.

Fig. 21 shows a wrapper, or blank, as it appears when punched, and scored, or creased, and severed from the web of material.

Figure 1:
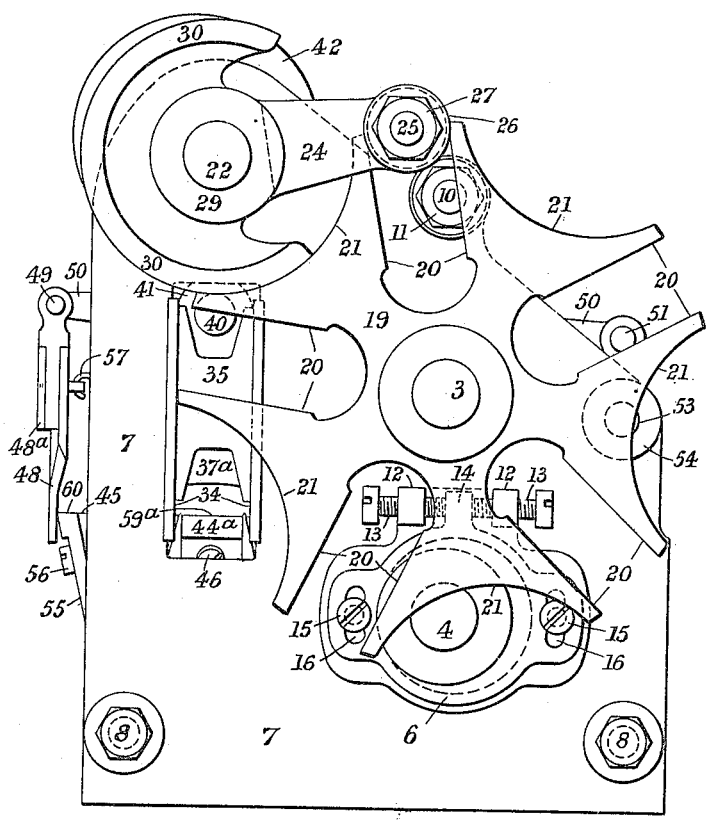
Figures 1 and 2 are elevations, at right angles to each other, of an apparatus constructed in accordance with this invention.

The rollers 1, and 2, are respectively secured to spindles 3, and 4, which are rotatable in bearings. The bearings 5, and 5ª, which support the ends of the spindle 3, are rigidly secured to, or form parts of, the side-frames 7 and 7ª, which are secured by the screws 8, to a base-plate 9, a tie-rod 10, with a nut 11, at each end, imparting lateral support to the upper part of the said frames.

The bearings, which support the ends of the spindle 4, are flanged eccentric bushes 6 and 6ª, which are supported in bosses on the side-frames 7 and 7ª. Adjusting screws 13, are screwed through lugs 12 in the side-frames, the inner ends of the said screws bearing against lugs 14, one on the flanged portion of each of the bearings 6 and 6ª, clamping screws 15 passing through slots 16, in the said flanged portions, to retain the bearings 6 and 6ª, in proper positions so that the distance between the axes of the rollers 1, and 2, can be adjusted and fixed by the proper manipulation of the adjusting screws 13, and the clamping screws 15.

A toothed wheel 17, corresponding in diameter with the roller 1, is secured to the shaft 3 and gears with another toothed wheel 18, which corresponds in diameter with the roller 2, and is secured to the shaft 4. Secured to the other end of the shaft 3, is a plate 19, provided with a suitable number of radially disposed slots 20, and sector-shaped recesses 21.

The main shaft 22 is rotatable in bearings 23, carried by the side-frames 7 and 7ª. A throw-arm 24, is provided with a pin 25, on which an anti-friction roller 26 can rotate, the said pin being secured to the throw-arm 24, by a nut 27, and a washer 28 (see Fig. 3) is riveted on the end of the pin 25, to retain the roller 26, in correct position. The throw-arm 24, extends from a boss 29, secured to the main shaft 22, on which boss a locking segment 30, is carried, or formed.

The main shaft 22, is rotated by any suitable means, (such for instance, as an electric motor) its continuous rotation causing the roller 26 to engage successively with the slots 20, in the disk, or star-wheel, 19, and thereby impart intermittent movements of partial rotation to the shaft 3, roller 1, toothed wheels 17, and 18, shaft 4, and roller 2. The rotation of the main shaft 22, also causes the segment 30, to engage, at the proper times, successively with the corresponding arc-shaped recesses 21, and prevent rotary movement of the wheel 19, and the rollers 1 and 2, which might otherwise occur when the roller 26 is not in effective engagement with a slot 20.

The roller 2 is provided with creasing disks 31, in suitable positions and there are grooves 32 in corresponding positions in, or between, the parts of the roller 1.

A bar, or frame, 33, is capable of reciprocating vertically in slotted ways 34 in the side-frames 7 and 7ª, with which ways the end portions 35, and 35ª, of the said bar, or frame, 33 engage.

To the under face of the bar, or frame, 33, punches 37, are secured by means of bolts 36, as seen clearly in Figs. 5, 7, and 8.

Reciprocatory vertical movements are given to the said bar, or frame, 33, by means of two eccentrics 38, formed in one with, or affixed to, the main shaft 22, and connected by straps and links 39, to a spindle 40, which passes through lugs 41, on the upper side of the bar, or frame, 33, plates 42, kept in place by headed bolts and nuts 43, retaining the straps and links 39 in proper position on the eccentrics 38.

The operative portion, or face, of the punches 37 are shown as being curved (preferably concaved) as illustrated at 37ª (see Fig. 6) so that easy and smooth operation thereof upon the material is insured.

Die-pieces 44, and 44ª, of the requisite shapes, according to the blanks required, are secured, by the screws 46, to a block, or bolster, 45, in correct positions relatively to the punches 37, tongues 47, on the die-pieces 44, and the sides of the die-pieces 44ª engaging corresponding grooves in the bolster 45, for guiding, in effecting adjustment (see Figs. 9, 10 and 11).

Figure 4:
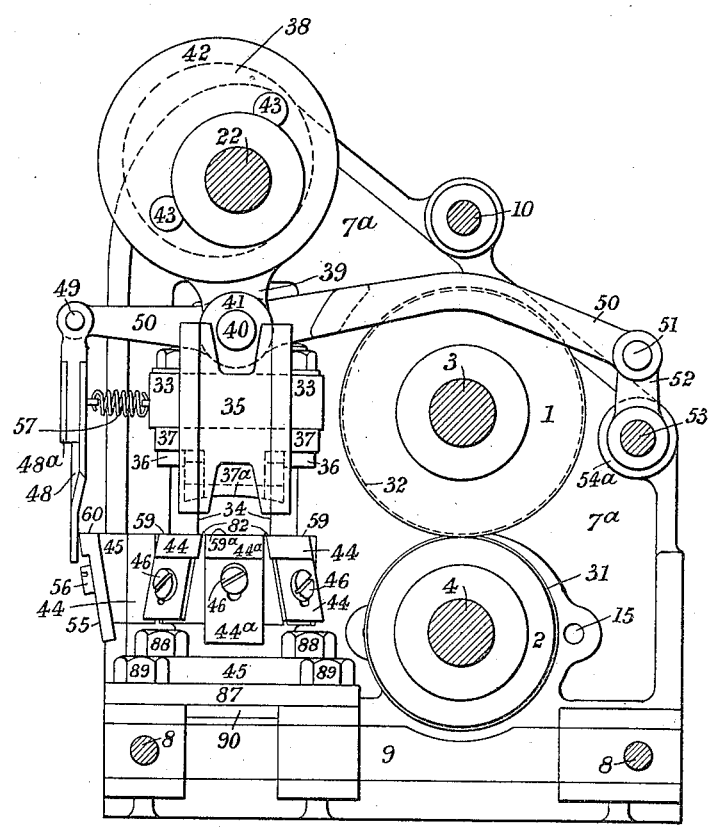

A cutting-blade 48, is carried by a plate 48ª, hinged by a pin 49, to one end of a bifurcated lever 50, the other ends of which are jointed by a spindle 51, to links 52, capable of rocking on a spindle 53 (see Fig. 4) supported in bearings 54, and 54ª, in the side-frames 7 and 7ª.

A stationary blade, or shearing plate, 55 is secured by screws 56, to the block, or bolster, 45, in correct position relatively to the movable cutting blade 48, a spring 57, retaining the said blade 48 against the stationary blade, or shearing plate, 55.

Figure 2:
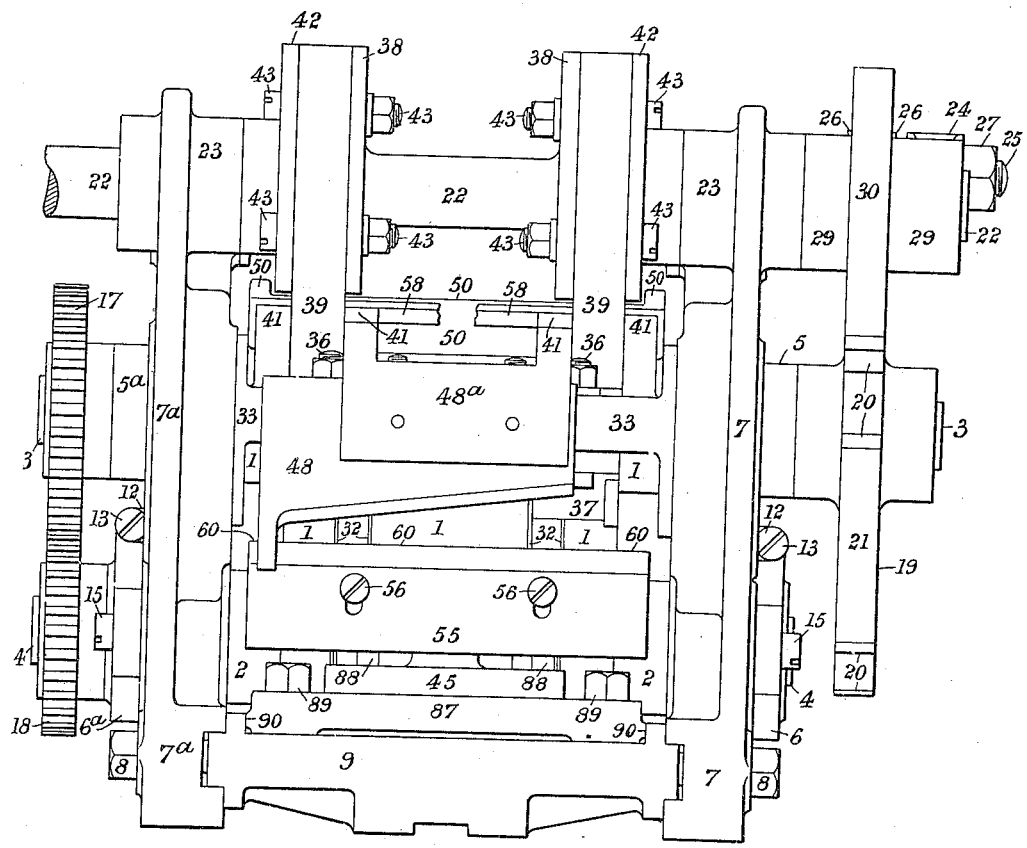
Figure 3:
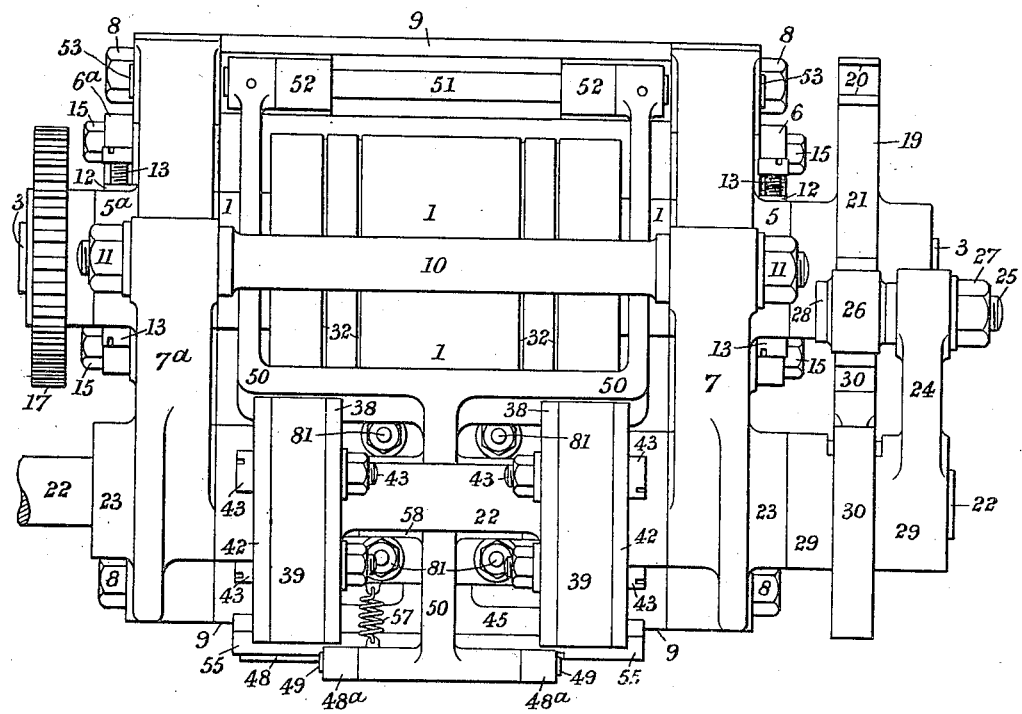
Fig. 3 is a plan and Fig. 4 is an elevation, corresponding to Fig. 1, but with one side-member of the main frame-work and the means for imparting intermittent movements of partial rotation to the rollers, removed.

The arm 50 is actuated by the eccentrics 38, the spindle 40 passing through a boss 58, on the said arm 50, (see Figs. 2 and 3).

To provide for grinding the die-pieces 44 and 44ª, and the stationary blade, or shearing plate, 55, with their acting portions, at the requisite angle their cross-sectional form is continued for some distance, at the requisite angle and they are capable of being adjusted in their guides on the block, or bolster, 45, at such corresponding angles, that, their acting faces and edges are level with the surface over which the web of material to be punched is passed. When the acting portions become worn they can be removed and mounted upon a suitably formed jig, and renovated by grinding. After grinding the acting faces, or edges, 59 and 59ª of the die-pieces 44 and 44ª respectively, and the upper edge 60 of the stationary blade, or shearing plate, 55, the die-pieces and stationary blade, or shearing plate, can be readily put in place again on the block, or bolster, 45, and accurately re-adjusted lengthwise in their correct positions, on the said supporting block, or bolster, so as to bring the new faces, and edges, produced by grinding into the planes which the original faces and edges occupied before they required grinding, and then fixing the said die-pieces and blade, or plate, in their adjusted positions by means of the screws 46 and 56.

The operative edges of the die pieces 44, and the shape of their upper faces, 59, can originally be readily and accurately produced by grinding as follows. The shape required for the upper face 59, is carefully marked out thereon and the die-pieces are then secured to a holder, or jig, 62 (see Figs. 17, 18 and 19) by means of screws 63. Each of the adjusting screws 64, engages a screw-thread in a boss 65, and is used to bring the said die-pieces, into proper position, on the jig 62.

The tongue 47, on each die-piece 44, engages a corresponding groove in the jig 62. When the said die-piece 44, is supported on the jig 62, in this manner, the upper portion of the said die-piece is disposed at a definite and pre-determined angle. The correct shape of the upper faces, 59, of the die-pieces and the correct inclination of the operative edges of the said die-pieces can be produced by bringing the said operative edges up to the face of a grinding disk, or wheel, rotating in a plane at right angles to the base of the jig 62, the operative edges of the said die-pieces being thus ground at the correct angles to the correct shape, indicated by the lines which were marked on the upper faces 59, of the said die-pieces.

Whenever, through wear, it is found necessary to renovate the said die-pieces they are removed and secured, at the necessary predetermined angle, to the jig 66, (see Figs. 14, 15, and 16) by means of screws 67. Adjusting screws 68, each working in bosses 69, are used to bring the die-pieces into correct position on the said jig, the tongues 47, on the said die-pieces engaging with corresponding grooves 66ª in the jig 66. The upper face 59, of each die-piece 44, is then brought up to a grinding disk, or wheel, rotating in a plane at right angles to the base of the jig 66.

In a similar manner, the upper face 59ª of the die-piece 44ª and the upper edge 60 of the stationary blade, or shearing-plate 55, can be renovated by grinding when necessary, the said die-pieces 44ª and plate, or blade, 55, being then supported on a jig 70, (see Figs. 12 and 13) and secured thereto, at the proper angle, by means of screws 71, and 72, adjusting screws 73 and 74, working respectively in bosses 75 and 76, being used to bring the said die-pieces 44ª and stationary blade, or shearing plate, 55, into proper positions on the jig 70. The upper faces 59ª of the die-pieces 44ª, and the upper edge 60 of the shearing-plate, or blade, 55, are then brought up to the face of a grinding disk, rotating in a plane at right angles to the base of the jig 70.

When the die-pieces 44, and 44ª, and the stationary blade, or shearing plate, 55, have been renovated, they are secured in their proper places on the block, or bolster, 45, care being taken that the upper faces 59 and 59ª, of the die-pieces 44 and 44ª, respectively and the upper edge 60, of the stationary blade, or shearing-plate, 55, are brought to the same plane, as the upper surface of the block, or bolster, 45; that is to say, to the plane which the upper faces of the said die-pieces and the upper edge of the stationary blade, or shearing plate, occupied before the grinding, or renovating, operation.

By reason of the hereinbefore described construction of the die-pieces 44 and 44ª and the stationary blade, or shearing plate 55 and the means described for use in renovating them and for securing them to the block, or bolster, the effective shapes the operative faces and edges of the die-pieces and their position relatively to the punches 37, and the position of the said stationary blade or shearing plate, relatively to the movable cutting blade can be always maintained as the shape of their acting parts remain the same notwithstanding the repeated grinding thereof, and they are always readily brought into correct position when replaced after grinding. A block, plate, or gage, having a plane underside, may be placed upon the block, or bolster, 45, to facilitate the exact placement of the die-pieces and stationary blade, or shearing plate, the upper faces of the die-pieces and the upper edge of the stationary blade, or shearing-plate, being brought up to the underside of the said block, plate, or gage, and then the said die-pieces and stationary blade, or shearing-plate, 55, are, by the screws 46 and 56, secured in their correct positions, on the said block, or bolster.

There are creasing-grooves 79, (see Fig. 7) in the block 80, which is secured to the reciprocatable frame 33, by the bolts 81, and there are corresponding ridges 82, (see Figs. 9, 10 and 11) on the upper face of the bolster 45, these grooves and ridges acting mutually, under the reciprocating movement of the frame 33, to score, or crease, the web of material in a direction at right angles to the line of travel of the said web.

In Fig. 20, a portion, 83, of the web of material is shown, with the creased, or scored, lines 84, parallel to the line of travel of the said web, which lines have been produced by the hereinbefore described disks 31, and corresponding grooves 32, while the scored, or creased, lines 85, at right angles to the lines 84, have been produced by the aforesaid grooves 79, and ridges 82.

The gaps 86, in the web of material have been produced by the removal of the corresponding portions of the web of material, which removal has been effected by the aforesaid punches 37, and die-pieces 44 and 44ª.

Fig. 21 shows a complete wrapper, or blank, which has been severed from the web of material 83, by the aforesaid movable cutting blade 48, and stationary blade, or shearing-plate 55.

The block, or bolster, 45, is secured to a removable plate 87, by means of screws 88, the said plate 87, being secured in proper position on the base-plate 9, by screws 89, so that the said block, or bolster, can be removed when desired, without disconnecting the side-frames 7 and 7ª, from the said base-plate 9.

The guiding strips 90, on the plate 87, engage with corresponding portions of the base plate 9, to properly position the plate 87, and consequently the block, or bolster, 45.

The co-action of the die-pieces 44, and 44ª, with the punches 37, and the cutting action of the blades 48 and 55, take place at, or about, the time the web of material 83, is held stationary between the rollers 1 and 2, which rollers, at this time, are prevented from making rotative movement by the engagement of the segment 30, with one of the sector-shaped recesses 21, in the aforesaid manner.

In operating the hereinbefore described apparatus, movement of partial rotation is imparted to the rollers 1 and 2 from the main shaft 22, by means of the throw-arm 24, roller 26, and slotted plate 19, and gearing described so that a suitable length of the web of material 83, is pulled, or drawn, off any conveniently disposed reel, not shown in the drawings. The segment 30, then engages with one of the recesses 21, and effects the temporary stoppage of the intermittent movements of rotation of the rollers 1 and 2.

The creasing disks 31, and corresponding grooves 32, act together to impart the scored, or creased, lines 84 to the web of material 83, which web is, by the operation of the rollers 1 and 2, caused to pass between the punches 37, and the die-pieces 44 and 44ª, and also between the movable cutting-blade 48, and the stationary blade, or shearing plate 55, as well as between the creasing grooves 79, and ridges 82.

While the rollers 1 and 2, are temporarily held stationary the continued rotation of the main shaft 22, operating through the eccentric disks 38, links 39, and parts aforesaid, effects the downward movement of the frame 33, and the action of the punches 37, and corresponding die-pieces 44 and 44ª, and the required openings, or gaps, 86 are made by the removal of the corresponding portions of the web of material. At, or about, the same time, the creasing-grooves 79, and ridges 82, act to make the scored, or creased, lines 85, in the web of material, and also at, or about, this same time the aforesaid rotation of the main shaft 22, operating through the eccentric disks 38, straps, and links 39, forked arm 50, and connections, effects the cutting operation by means of the blades 48 and 55, and a wrapper, or blank, such as is shown in Fig. 21, is severed from the web of material.

The continued rotation of the main-shaft 22, causes the return of the movable operating parts to the positions which they occupied at the commencement of the hereinbefore described operations and thereafter another movement of partial rotation is imparted to the rollers 1 and 2, and the hereinbefore described sequence of operations is repeated.

This invention is not limited to the precise details of construction hereinbefore described and illustrated in the accompanying drawings, as it will be evident that modifications in such details may be made without departing from the nature of the invention.

What I claim is:—

1. In apparatus for scoring, punching and cutting, paper, cardboard, and the like; the combination, with a punching device, of a die-piece, formed on an incline, and adjustable and fixable on a correspondingly inclined support, or bolster, the said die-piece, being made with a continuation, from its operative face and edge, of the same cross-sectional form as the said face and edge, so that fresh operative faces and edges can be readily made and afterward be brought into, and fixed in, correct position for work; substantially as hereinbefore explained.

2. In apparatus in accordance with the preceding claiming clause; a punching device provided with an acting face of curved (preferably concave) shape; substantially as, and for the purpose, hereinbefore explained.

3. In apparatus in accordance with the first preceding claiming clause; a cutting device comprising an inclined stationary blade, or shearing plate, carried on a correspondingly inclined support so as to coact with a movable cutting blade the said stationary blade, or plate, being made with a continuation of the same cross-sectional form as its shearing face so that fresh cutting edges can be readily made when required and be brought into, and fixed in, correct position for work; substantially as hereinbefore explained.

4. In apparatus in accordance with the preceding first claiming clause; means for scoring the blanks, the said means comprising an intermittently rotatable roller provided with scoring ridges, or disks, and adapted to operate substantially as hereinbefore described and illustrated in the accompanying drawings.

5. In an apparatus in accordance with the preceding first claiming clause; means whereby the punching, and the creasing at right angles to the direction of travel of the web of material, and its severance into blanks, are caused to take place when the said web is held stationary by the feeding rollers which, at that time, are locked against rotative movement substantially as hereinbefore described and illustrated in the accompanying drawings.

In testimony whereof I have signed my name to this specification in the presence of two subscribing witnesses.

WILLIAM ROSE.

Witnesses:
E. O. GEORGE,
THOMAS D. PRESTAGE.